Oct. 11, 1932.   A. R. GILMORE   1,881,485
FLUSH VALVE CONSTRUCTION
Filed May 26, 1930
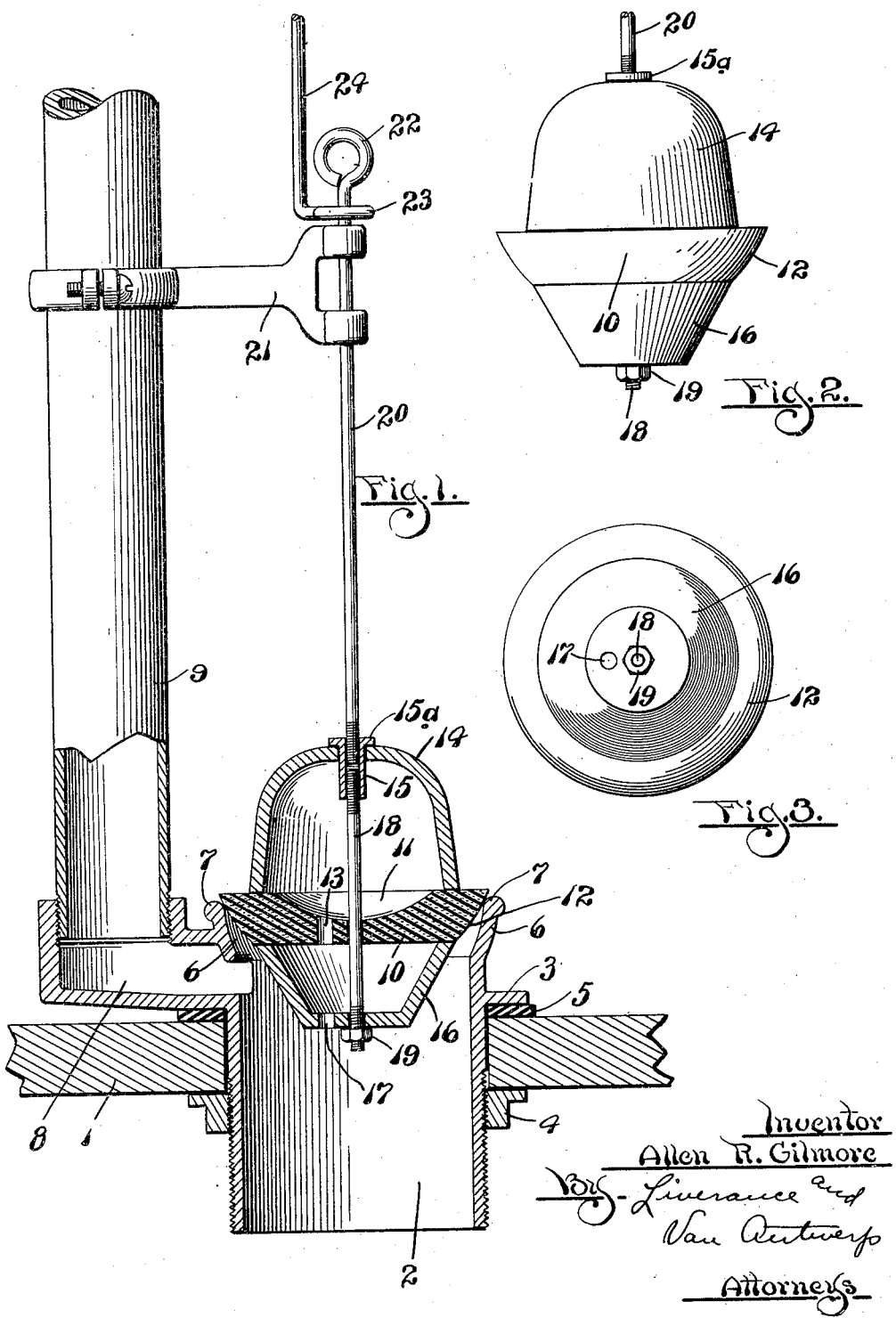
Inventor
Allen R. Gilmore
By Liverance and
Van Antwerp
Attorneys Patented Oct. 11, 1932

1,881,485

UNITED STATES PATENT OFFICE

ALLEN R. GILMORE, OF ST. LOUIS, MISSOURI

FLUSH VALVE CONSTRUCTION

Application filed May 26, 1930. Serial No. 455,643.

This invention relates to a float valve construction for flushing tanks. The ordinary float valve for tanks of this character is a hollow rubber ball having an under-surface of substantially semi-spherical form, the rubber being of a soft character at least at the under part of the valve and having walls thin and flexible. The rubber, subjected to the action of chemicals, even though of small content in solution in the water, is subject to quite rapid deterioration so that the float valves in many cases become worn and deteriorated, many within a year's time, while it is seldom that any of the same last over three years. The cost of replacement, not to mention the enormous loss of water passing the valves, is very high.

My invention is directed to a novel construction of float valve for purposes stated in which there are no thin walls of soft rubber to deteriorate but in which the structure of the valve is such that its life is greatly prolonged. The invention moreover is simple, yet particularly practical for the purposes for which it is designed. An understanding of the invention may be had from the following description, taken in connection with the accompanying drawing, in which, Fig. 1 is a fragmentary vertical section through the float valve of my invention, illustrating the manner in which it is used.

Fig. 2 is a side elevation of the float valve, and

Fig. 3 is a plan view thereof.

Like reference characters refer to like parts in the different figures of the drawing.

Flushing tanks are designed to hold a quantity of water and in the bottom thereof, which bottom is fragmentarily indicated at 1 in Fig. 1, an opening is made for an outlet sleeve which extends through the opening and connects with a bowl to which the water delivered from the tank is carried. The sleeve 2 may be provided with an outwardly extending flange 3 a short distance below its upper end portion and is threaded exteriorly at its lower end portion for the reception of a binding and clamping nut or ring 4. A gasket 5 of rubber or other suitable material is located between the underside of the flange 3 and the upper side of the tank bottom 1, thereby making a water-tight connection to prevent leakage of water around the sleeve. The upper portion of the sleeve is formed with an outwardly and upwardly curved seat section 6 terminating in a bead 7, as shown, forming a seat against which the float valve normally bears.

The sleeve 2, near the upper float valve seat described, also has an integral flanged inlet 8 extending from one side thereof with which a vertical overflow pipe 9 is connected extending upwardly in the tank to take care of the water in the tank if for any reason it reaches a higher level than the upper end of the overflow pipe. Such construction thus far described is conventional and well known and is not new with me.

The float valve of my invention is constructed of three members bound together by a connecting rod. One of the members, located between the other two, comprises a disc 10 of soft rubber which has flat upper and lower sides, except for a concave recess or depression 11 in the upper side thereof. This disc or body of soft rubber is of greater area at its upper than at its lower side and is formed with a curved annular outer edge or surface 12 on a different radius and from a different center than the curvature of the inner side of the said portion 6. The member 10 also has a small vertical opening 13 therethrough leading from the bottom of the depression 11.

Above the member 10 of soft rubber, is an inverted dome like member 14, preferably of hard rubber, which is located against the upper side of the member 10, as shown in Figs. 1 and 2, being spaced a short distance from the extreme outer edge of said member 10. An opening is made in the upper side of the dome or cup-like member 14 for the passage of an interiorly threaded sleeve 15 of small diameter which, at its upper end, is formed with an outwardly extending flange 15a bearing against the upper outer side of the member 14.

At the underside of the soft rubber member 10 is a third member 16, of hard rubber preferably, which may be in the form of a frustrum of a cone and provided with an opening 17 in its underside, as shown.

The three parts of the float valve are connected together by a connecting rod 18 which is threaded at both ends. The upper end of the rod, after passing through the bottom of the member 16 and through the intermediate soft rubber member 10, threads into the lower end of the sleeve 15 while its lower threaded end extends through the bottom of the under member 16 and has a binding and locking nut 19 thereon. It is evident that the lower edges of the upper member 14 and upper edges of the lower member 16 press firmly and snugly against the opposite sides of the intermediate soft rubber member 10.

The lifting mechanism for the float valve may be identical with that used with other float valves, consisting of a vertical rod 20, the lower end threaded into the upper end of the sleeve 15, its upper portion guided in guides at the free end of a bracket 21 mounted on the overflow pipe 9, and its upper end formed with an eye 22 located above a horizontal eye 23 turned laterally from a second vertical lift rod 24 in the usual manner. It is evident that the float valve of my invention is interchangeable with float valves now commonly used as the sleeve 15 is threaded with the standard threads for receiving the lower threaded ends of commonly used lift rods such as 20.

The float valve described is one of long life not subject to rapid deterioration. Only a very small portion of the soft rubber member 10 is exposed to the action of the water and its rounded surface at 12 engages against and makes a tight seat with the bead 7 as is evident. Any condensation within the upper member 14, or water which may get thereto in any way is collected in the depression 12 and drained therefrom through the openings 16 and 17.

The float valve described is one particularly practical and serviceable, of great durability, readily substituted for float valves now in use when the same are replaced, and in every way is a marked improvement over the commonly used float valves but particularly in durability and serviceability. The invention is defined in the appended claims and is to be considered comprehensive of all forms of structure coming within their scope.

I claim:

1. A float valve comprising, an intermediate disc of soft rubber having horizontal upper and lower sides and formed at its outer annular surface with downwardly and inwardly curved shape, a hollow member of relatively hard material bearing against the upper side of the disc, a like member bearing against the lower side of the disc, and means for connecting and binding the parts together, said disc at its upper side and within the part covered by said upper member having a depression therein and an opening extending from said depression through the disc, and said lower member having an opening through its lower side.

2. A float valve comprising, a disc of relatively soft rubber having horizontal upper and lower sides and having a downwardly and inwardly curved annular surface around it, an inverted cup-like member of hard rubber over and bearing against the upper side of the intermediate member; a lower cup-like member of hard rubber under and bearing against the underside of the intermediate member, means for connecting the parts together, and means to drain the space between the intermediate and upper member through the intermediate and lower members.

3. In combination, an intermediate disc member of substantial thickness formed of relatively soft rubber, said disc member having its outer edge tapered in curved form relative to the axis of the disc, and adjustable means adapted to place the disc under pressure whereby the edge of the disc is altered in in shape.

4. A combination of elements as set forth in claim 3 in which the said adjustable means includes an inverted cup-like member located over the disc and adapted to press thereagainst, said disc having a recess under the cup-like member and an opening leading therefrom downwardly through the disc for the purpose described.

In testimony whereof I affix my signature.

ALLEN R. GILMORE.